(12) United States Patent
McNaught

(10) Patent No.: US 8,959,989 B2
(45) Date of Patent: Feb. 24, 2015

(54) TIRE TREAD GAUGE

(75) Inventor: Timothy J. McNaught, Waldwick, NJ (US)

(73) Assignee: McNaught Industries, LLC, Waldwick, NJ (US)

( * ) Notice: Subject to any disclaimer, the term of this patent is extended or adjusted under 35 U.S.C. 154(b) by 0 days.

(21) Appl. No.: 13/596,341

(22) Filed: Aug. 28, 2012

(65) Prior Publication Data

US 2014/0060167 A1 Mar. 6, 2014

(51) Int. Cl.
*G01M 17/02* (2006.01)
(52) U.S. Cl.
USPC ........................................... 73/146
(58) Field of Classification Search
USPC ............................... 73/146–146.8
See application file for complete search history.

(56) References Cited

U.S. PATENT DOCUMENTS

| | | | | |
|---|---|---|---|---|
| 2,654,156 A * | 10/1953 | Boyer | ............................ | 33/836 |
| 3,696,668 A * | 10/1972 | Patrick | ........................ | 73/146.8 |
| 4,193,295 A * | 3/1980 | Curran | ........................ | 73/146.8 |
| 4,244,214 A * | 1/1981 | Curran | ........................ | 73/146.8 |
| 4,526,030 A * | 7/1985 | Vecera, Jr. | .................... | 73/146.8 |
| 4,884,175 A * | 11/1989 | Weng | ........................... | 362/119 |
| 4,966,035 A * | 10/1990 | Huang | ......................... | 73/146.8 |
| 4,970,894 A * | 11/1990 | Huang | ......................... | 73/146.8 |
| 5,656,772 A * | 8/1997 | Markel | ......................... | 73/146.8 |
| 6,196,807 B1 * | 3/2001 | Wu | ................................. | 417/63 |
| 6,978,670 B2 * | 12/2005 | Cousineau | .................... | 73/146.8 |
| 7,197,919 B2 * | 4/2007 | Wu | ................................. | 73/146 |
| 7,497,113 B1 * | 3/2009 | Patel | .............................. | 73/146 |
| 8,573,046 B1 * | 11/2013 | Ohm et al. | .................... | 73/146.3 |
| 2005/0204807 A1 * | 9/2005 | Tseng | ............................. | 73/146 |
| 2006/0277988 A1 * | 12/2006 | Huang | ......................... | 73/146.8 |

* cited by examiner

*Primary Examiner* — Andre Allen
(74) *Attorney, Agent, or Firm* — Myers Wolin, LLC

(57) ABSTRACT

A compact, easy to use tire tread gauge has a window that displays an indication of the condition of an automobile tire and whether it needs to be replaced because of tread wear.

17 Claims, 3 Drawing Sheets

TIRE TREAD GAUGE

TECHNICAL FIELD

This invention relates broadly to an apparatus for measuring the depth of tire treads for grooved tires. More particularly, this invention relates to a compact and attractive tire tread gauge that is a convenient, easy to use tool, used to measure tire treads to maintain safety. The gauge may be used to measure tire tread depth in standard and/or metric units.

BACKGROUND

The tread of a tire is the portion of the circumferential surface of the tire that contacts the road surface. Traditionally, automobile, motorcycle, truck, bicycle, and airplane tires have a series of grooves that intersect the tire tread dividing it into several parts. On most race cars, "slick" tires are used. These tires have a single tread that extends from one sidewall to the other and has no grooves. Standard tires (i.e. tires with grooves) have a strong grip of the road surface so long as (i) the tire is not over-worn and (ii) the weather is dry and warm. In wet weather conditions they tend to aquaplane or hydroplane because water on the surface of the road interferes with the tread contacting the road surface. In Formula 1 racing, special grooved tires are fitted on the race cars during wet conditions. The pattern of grooves serves to disperse water and somewhat avoid aquaplaning and hydroplaning. There are two types of Formula 1 wet weather tires: "wet" and "extreme wet". The former are used when it is raining and the latter when there are puddles of standing water on the track.

Other tires (e.g., those used on passenger vehicles and on commercial trucks, airplanes, etc.) have multiple treads that are separated by complex grooves. The grooves do not improve traction under dry conditions, but they do serve to avoid hydroplaning and aquaplaning in wet weather. The grooves also provide an easy means for measuring the age of the tire and whether the tire is safe to drive on. As tire treads wear, the depth of the grooves is shortened thereby diminishing the ability of the grooves to effectively disperse water.

Most drivers examine their vehicle's tires just by looking at the treads. However, there are more accurate ways to measure the depth of the grooves, the age of the tire, and whether the tire is safe. A new tire typically has $10/32$" groove depth. A groove depth of $8/32$" is still fine to drive. A depth of $6/32$" is an ample depth, but it may be difficult to stop in the snow. With a depth of $4/32$", it may be difficult to stop in the rain. A tire is considered "bald" when the groove depth is $2/32$". This tire is not safe to use even in dry conditions.

One way to measure the groove depth is to use a coin. Place a penny into several tread grooves at least 15" apart circumferentially on the tire. When part of Lincoln's head is covered, it means the tire has more than $2/32$" of tread thickness. If the top of his memorial is always covered, then the tire has more than $6/32$" of tread thickness. However, it is difficult for most people to remember these rules.

There are plenty of tire tread gauges available, but they are relatively large and difficult to use.

SUMMARY

The present invention provides a compact, attractive, and easy to use tire tread gauge. According to a first embodiment, the gauge is a cylinder that is approximately one and one eighth inches in diameter and approximately one quarter of an inch thick. There is a radial bore at the bottom of the cylinder through which a measuring stick extends. At the top of the stick is a stopper that prevents the stick from completely exiting the cylinder. The stopper is coupled to indicting text messages that are viewable through a window on one side of the cylinder. When the stick is fully within the cylinder, the text message is preferably a brand name or the name of a company that is being promoted by gifting the gauge to their customers. When the stick extends fully out of the cylinder ($10/32$" or 7.9375 mm), the text message is "NEW" in white lettering, preferably on a green background. When it extends out $8/32$" or 6.35 mm, the message displayed is "GOOD" in white lettering, preferably on a blue background. When it extends out $6/32$" or 4.7625 mm, the message is "OK" in white lettering, preferably on a purple background. When the stick extends out $4/32$" or 3.175 mm, the message is "REPLACE" in white lettering, preferably on an orange background. When the stick extends only $2/32$" or 1.5875 mm, the message is "DANGER" in white lettering, preferably on a red background.

According to second, third, and fourth embodiments, the portion of the cylinder where the measuring stick exits is flattened. This may help making sure that the stick lies along a radius of the tire so that more accurate measurements are made. Otherwise, these embodiments function in the same way as the first embodiment. The second, third, and fourth embodiments are also decorative. One is designed to look like a flat tire. One is designed to look like a donut, and one is designed to look like a woman's purse and may assume a shape other than cylindrical. In all four embodiments, a loop may be provided opposite the stick exit for attaching the gauge to a key ring. These are examples of designs that can be used for the invention.

It is also contemplated that as part of the present invention that the displaying of tire condition may be part of a video display unit. Further, it is also an object of the invention to have an audible alert to inform the user as to the condition of a tire. Additional objects and advantages of the invention will become apparent to those skilled in the art upon reference to the detailed description taken in conjunction with the provided figures.

DETAILED DESCRIPTION

Figure 1:
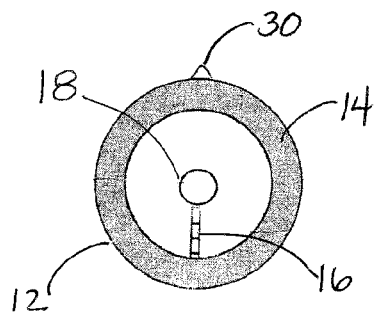
FIG. 1 is a transparent view through one side of the first embodiment showing the measuring stick fully retracted.

Turning now to FIGS. 1 through 8, a first embodiment 10 of the gauge is a cylinder 12 that is approximately one and one eighth inches in diameter and approximately one eighth inch thick. There is a radial bore 14 at the bottom of the cylinder through which a measuring stick 16 extends through a wall that is approximately one quarter inch thick. At the top of the stick is a stopper 18 that prevents the stick from completely exiting the cylinder 12. The stopper is coupled to a plurality of indicting text (or color) messages 20 that are viewable through a window 22 on one side of the cylinder 12.

Figure 2:
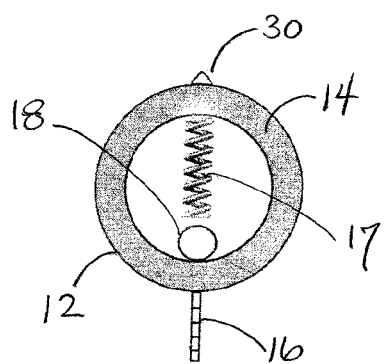
FIG. 2 is a view similar to FIG. 1 showing the measuring stick fully extended by an optional spring.

As shown in FIG. 2, it may be advantageous to provide a biasing spring 17 to urge the stick 16 out of the housing 12. However, it may be deemed sufficient to allow gravity to perform this function without the aid of a spring.

Figure 3:
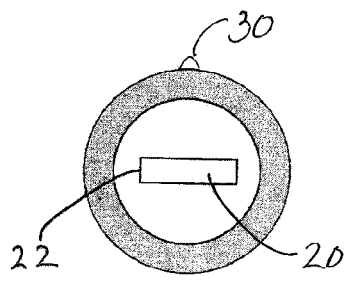
FIG. 3 shows the message window with the measuring stick fully retracted.

When the stick 16 is fully within the cylinder as shown in FIGS. 1 and 3, the text message 20 is preferably a brand name or the name of a company that is being promoted by gifting the gauge to their customers.

Figure 4:
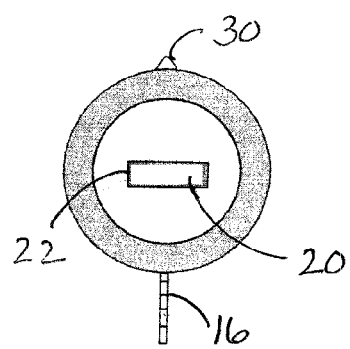
FIG. 4 shows the message window with the measuring stick fully extended.

When the stick 16 extends fully out of the cylinder (10/32" or 7.9375 mm) as shown in FIG. 4, the text message 20 is "NEW", preferably on a green background or simply the color green with no text message.

Figure 5:
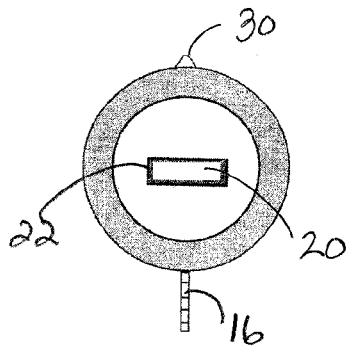
FIGS. 5-8 show the message window with the measuring stick in various stages of retraction.

When the stick 16 extends out 8/32" or 6.35 mm as shown in FIG. 5, the message displayed is "GOOD", preferably on a blue background or simply the color blue with no text message.

Figure 6:
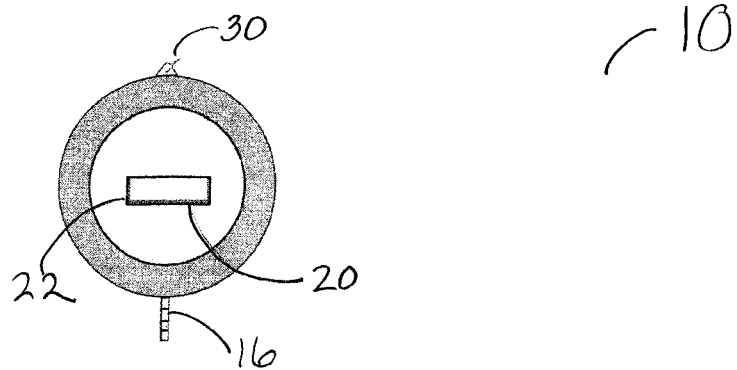
Figure 7:
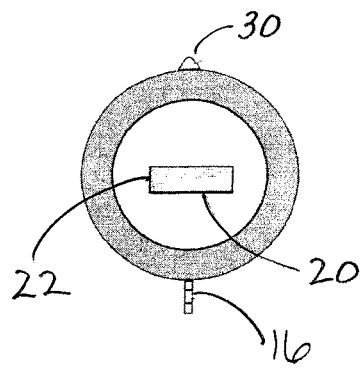
Figure 8:
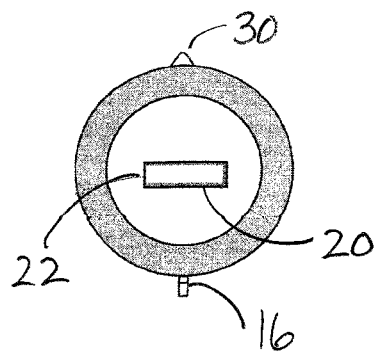
Figure 9:
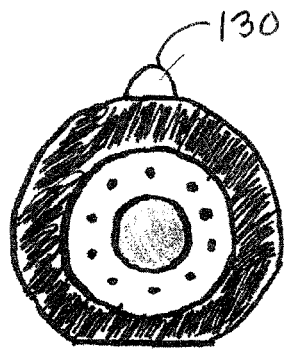
FIGS. 9-10 show opposite sides of a second embodiment with the measuring stick fully retracted.
Figure 10:
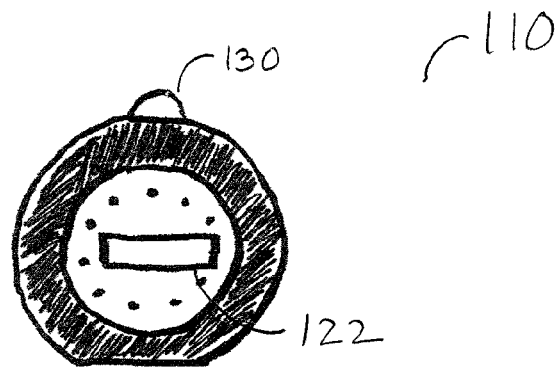
Figure 11:
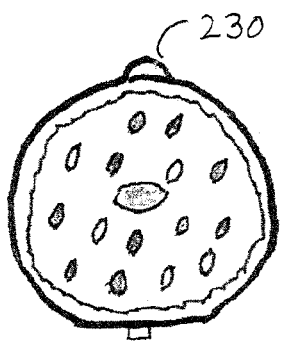
FIGS. 11-12 show opposite sides of a third embodiment with the measuring stick mostly retracted.
Figure 12:
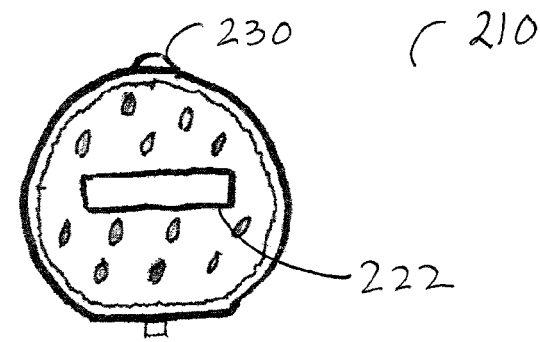
Figure 13:
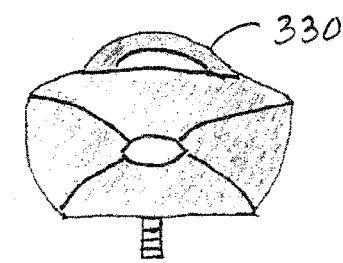
FIGS. 13-14 show opposite sides of a fourth embodiment with the measuring stick partially retracted.
Figure 14:
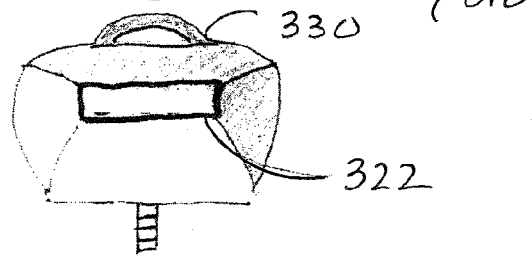

When the stick 16 extends out 6/32" or 4.7625 mm as shown in FIG. 6, the message 20 is "OK", preferably on a purple background or simply the color purple with no text.

When the stick 16 extends out 4/32" or 3.175 mm, the message 20 is "REPLACE", preferably on an orange background or simply the color orange with no text.

When the stick 16 extends only 2/32" or 1.5875 mm, the message 20 is "DANGER", preferably on a red background or simply the color red with no text.

According to second, third, and fourth embodiments, FIGS. 9-14, the portion of the cylinder where the measuring stick exits is flattened. This may help making sure that the stick lies along a radius of the tire so that more accurate measurements are made. Otherwise, these embodiments function in the same way as the first embodiment. The second, third, and fourth embodiments are also decorative. One 110 is designed to look like a flat tire. One 210 is designed to look like a donut, and one 310 is designed to look like a woman's purse and may assume a shape other than cylindrical. All are provided with a window 122, 222, 322 which operates as described with reference to the first embodiment.

In all four embodiments, a key loop 30, 130, 230, 330 may be provided opposite the stick exit for attaching the gauge to a key ring.

There have been described and illustrated herein several embodiments of a tire tread gauge. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A tire tread gauge, comprising:
a housing defining a window;
a measuring stick biased outwardly from said housing for slidably measuring a depth of a tire tread; and
a plurality of indicators distinct from and coupled to said measuring stick and being viewable one at a time through said window, wherein which of the plurality of indicators is viewable through said window depends on how far said measuring stick extends out of said housing
wherein the measuring stick is biased outwardly from said housing by a biasing element and is urged outward by the biasing element during measurement.

2. The tread gauge according to claim 1, wherein the window is a video display unit that display's a graphical representation of a plurality of indicators.

3. The tread gauge according to claim 1, wherein the window is an audio unit that audibly tells a user the condition of the tire.

4. The tread gauge according to claim 1, further comprising:
a spring biasing said measuring stick out of said housing.

5. The tread gauge according to claim 1, wherein:
said housing is substantially cylindrical.

6. The tread gauge according to claim 1, wherein:
said window is rectangular.

7. The tread gauge according to claim 1, wherein:
said indicators include the text messages OK and REPLACE.

8. The tread gauge according to claim 5, wherein:
said indicators include the text messages NEW, GOOD, and DANGER.

9. The tread gauge according to claim 1, wherein:
said indicators include the colors red and green.

10. The tread gauge according to claim 7, wherein:
said indicators include the colors blue, purple, and orange.

11. The tread gauge according to claim 1, wherein:
said housing includes a key loop for attaching the gauge to a key ring.

12. The tread gauge according to claim 1, wherein:
the housing is designed to look like an automobile tire.

13. The tread gauge according to claim 1, wherein:
the housing is designed to look like a donut.

14. The tread gauge according to claim 1, wherein:
the housing is designed to look like a purse.

15. The tread gauge according to claim 1, wherein:
the measuring stick extends out of the housing at least 8/32".

16. The tread gauge according to claim 1, wherein:
the measuring stick extends out of the housing approximately 10/32".

17. The tread gauge according to claim 1, wherein:
the plurality of indicators shown do not provide quantitative measurements.

\* \* \* \* \*